(12) United States Patent
Dang et al.

(10) Patent No.: US 10,555,247 B2
(45) Date of Patent: Feb. 4, 2020

(54) ROAMING NETWORK ACCESS METHOD AND APPARATUS

(71) Applicant: Huawei Device Co., Ltd., Dongguan (CN)

(72) Inventors: Shujun Dang, Beijing (CN); Guanzhong Tan, Shenzhen (CN); Feng Zhang, Beijing (CN)

(73) Assignee: Huawei Device Co., Ltd., Dongguan (CN)

( * ) Notice: Subject to any disclaimer, the term of this patent is extended or adjusted under 35 U.S.C. 154(b) by 0 days.

(21) Appl. No.: 15/300,205

(22) PCT Filed: Mar. 28, 2014

(86) PCT No.: PCT/CN2014/074267
§ 371 (c)(1),
(2) Date: Sep. 28, 2016

(87) PCT Pub. No.: WO2015/143701
PCT Pub. Date: Oct. 1, 2015

(65) Prior Publication Data
US 2017/0142643 A1    May 18, 2017

(51) Int. Cl.
*H04W 4/00*    (2018.01)
*H04W 48/16*    (2009.01)
(Continued)

(52) U.S. Cl.
CPC ............ *H04W 48/16* (2013.01); *H04W 8/06* (2013.01); *H04W 8/08* (2013.01); *H04W 48/18* (2013.01)

(58) Field of Classification Search
None
See application file for complete search history.

(56) References Cited

U.S. PATENT DOCUMENTS 7,480,507 B2    1/2009    Kuroda et al.
7,826,844 B2 *  11/2010   Cooper ................. H04W 48/18
                                                455/166.2
(Continued)

FOREIGN PATENT DOCUMENTS

CN    101040551 A    9/2007
CN    101409917 A    4/2009
(Continued)

OTHER PUBLICATIONS

3$^{rd}$ Generation Partnership Project; Technical Specification Group Core Network and Terminals; Mobile radio interface Layer 3 specification; Core network protocols; Stage 3 (Release 12), 3GPP TS 24.008, V12.5.0, pp. 1-691, 3$^{rd}$ Generation Partnership Project, Valbonne, France (Mar. 2014).
(Continued)

Primary Examiner — Jinsong Hu
Assistant Examiner — Alexander J Yi
(74) Attorney, Agent, or Firm — Leydig, Voit & Mayer, Ltd.

(57) ABSTRACT

Embodiments of the present invention provide a roaming network access method and apparatus, where the method includes: acquiring, by user equipment, a list of networks with which registration can be successful; searching, by the user equipment, for an available network in a roaming area; each time the user equipment finds an available network, determining, by the user equipment, whether the found available network is recorded in the list of networks with which registration can be successful; and if yes, attempting, by the user equipment, to register with the found available network. According to the roaming network access method and apparatus provided in the embodiments of the present invention, duration of network searching performed by user equipment is reduced, time spent by the user equipment on initial network access in a roaming area is shortened, and user experience is improved.

12 Claims, 3 Drawing Sheets

(51) Int. Cl.
*H04W 8/06* (2009.01)
*H04W 8/08* (2009.01)
*H04W 48/18* (2009.01)

(56) References Cited

U.S. PATENT DOCUMENTS

| | | |
|---|---|---|
| 2006/0079224 A1 | 4/2006 | Welnick et al. |
| 2011/0151836 A1 | 6/2011 | Dadu et al. |
| 2012/0243467 A1* | 9/2012 | Vallurupalli .......... H04W 48/18 370/328 |
| 2012/0310762 A1 | 12/2012 | Robbin et al. |
| 2013/0084855 A1* | 4/2013 | Ekici .................... H04W 48/18 455/432.1 |
| 2013/0170486 A1 | 7/2013 | Wang et al. |
| 2013/0305369 A1* | 11/2013 | Karta ................. H04L 63/1416 726/23 |
| 2014/0342732 A1* | 11/2014 | Manalo .................. H04W 8/06 455/433 |
| 2015/0087302 A1 | 3/2015 | Yang et al. |

FOREIGN PATENT DOCUMENTS

| | | |
|---|---|---|
| CN | 101895966 A | 11/2010 |
| CN | 101951586 A | 1/2011 |
| CN | 102149068 A | 8/2011 |
| CN | 102970733 A | 3/2013 |
| EP | 1439727 A2 | 7/2004 |
| JP | 2007235593 A | 9/2007 |
| JP | 2008263304 A | 10/2008 |
| JP | 2012257304 A | 12/2012 |
| JP | 2013081158 A | 5/2013 |
| WO | WO 2006044024 A1 | 4/2006 |
| WO | 2012129321 A1 | 9/2012 |

OTHER PUBLICATIONS

"3rd Generation Partnership Project; Technical Specification Group Core Network and Terminals; Non-Access-Stratum (NAS) functions related to Mobile Station (MS) in idle mode (Release 12)," 3GPP TS 23.122, V12.4.0, XP050769790, pp. 1-45, 3rd Generation Partnership Project, Valbonne, France (Mar. 2014).
JP 2017-501441, Office Action, dated Dec. 5, 2017.

* cited by examiner

ROAMING NETWORK ACCESS METHOD AND APPARATUS

CROSS-REFERENCE TO RELATED APPLICATIONS

This application is a national stage of International Application No. PCT/CN2014/074267, filed on 28 Mar. 2014, which is hereby incorporated by reference in its entirety.

TECHNICAL FIELD

Embodiments of the present invention relate to communications technologies, and in particular, to a roaming network access method and apparatus.

BACKGROUND

After startup or during roaming of user equipment (UE), a primary task is to select a public land mobile network (PLMN) and successfully register with the PLMN, and only in this way, the UE can obtain communications services such as calling and data transmission.

After startup, the UE first attempts to register with a public land mobile network with which the UE successfully registered with last time (Registered PLMN, RPLMN for short). If the registration fails, the UE performs full-band network searching. The UE searches for all networks according to frequency bands and radio access technologies (RAT) that are supported by the UE, and then a list of available networks is formed, where each element in the list includes a PLMN and a RAT of an available network. Duration of the full-band network searching performed by the UE mainly depends on factors such as a frequency band and a RAT that are supported by the UE, a quantity of coverage cells in an area in which the UE is located, and software and hardware restrictions of the UE.

To facilitate faster registration of the UE with an available network, the UE selects a PLMN in a list of found available networks according to a specific rule. It is stipulated in the 3rd Generation Partnership Project (3GPP) specifications that UE selects a PLMN in the following sequence: home public land mobile network (Home PLMN, HPLMN for short)→user controlled public land mobile network (User PLMN, UPLMN for short)→operator controlled public land mobile network (Operator PLMN, OPLMN for short)→other available PLMNs ( ). For example, the UE sets, according to signal quality of the HPLMN, UPLMN, OPLMN, and other available PLMNs, priorities for available networks in the list of the found available networks, and sorts the available networks in descending order of the priorities; and the UE selects available networks in sequence according to the priorities and attempts to register, until the registration is successful.

For each selected available network, a registration process of the UE involves multiple rounds of network-wide signaling message exchange; moreover, when one registration attempt fails, the UE needs to continue to attempt to register with a same available network until a preset stop condition is satisfied, for example, a quantity of failed attempts reaches a preset quantity-of-failed-attempts threshold; therefore, a relatively long delay is caused when the UE attempts to register with an available network. In addition, in a scenario in which the UE is roaming, if there is a large quantity of operators in a roaming area of the UE, a list of available networks is long, for example, there are many small operators in Hong Kong, America, and some European countries, and the list of available networks may include dozens of elements (PLMN, RAT).

In the prior art, when UE initially accesses a network in a roaming area, it needs to take a relatively long time for the UE to successfully register with a network in the roaming area, which affects user experience due to an excessively long waiting time.

SUMMARY

Embodiments of the present invention provide a roaming network access method and apparatus, to reduce time spent by user equipment on initial network access in a roaming area.

According to a first aspect, an embodiment of the present invention provides a roaming network access method, where the method includes:

acquiring, by user equipment, a list of networks with which registration can be successful;

searching, by the user equipment, for an available network in a roaming area;

each time the user equipment finds an available network, determining, by the user equipment, whether the found available network is recorded in the list of networks with which registration can be successful; and if yes, attempting, by the user equipment, to register with the found available network.

According to the first aspect, in a first possible implementation manner of the first aspect, the list of networks with which registration can be successful is a list used for recording historical roaming information, where the historical roaming information is information about a network with which the user has successfully registered during roaming.

According to the first possible implementation manner of the first aspect, in a second possible implementation manner of the first aspect, after the attempting, by the user equipment, to register with the found available network, the method further includes:

determining, by the user equipment, whether the registration is successful; and if yes, determining, by the user equipment, whether the found available network is recorded in the historical roaming information, and when it is determined that the found available network is not recorded in the historical roaming information, adding a record of the found available network into the historical roaming information; or if not, determining, by the user equipment, whether the found available network is recorded in the historical roaming information, and when it is determined that the found available network is recorded in the historical roaming information, deleting a record of the found available network from the historical roaming information.

According to the first aspect, in a third possible implementation manner of the first aspect, the list of networks with which registration can be successful is used for recording information about an operator-supported roaming network.

According to the first aspect and any one of the first to third possible implementation manners of the first aspect, in a fourth possible implementation manner of the first aspect, after the acquiring, by user equipment, a list of networks with which registration can be successful, the method further includes: acquiring, by the user equipment, a mobile country code of a network covering the roaming area; and after the determining, by the user equipment, that the found available network is recorded in the list of networks with which registration can be successful and before the attempting, by the user equipment, to register with the found available network, the method further includes:

determining, by the user equipment, whether the found available network is a network that is in the list of networks with which registration can be successful and that matches the mobile country code; and if yes, performing, by the user equipment, the step of attempting to register with the found available network.

According to the first aspect and any one of the first to fourth possible implementation manners of the first aspect, in a fifth possible implementation manner of the first aspect, the list of networks with which registration can be successful is stored in a non-volatile memory of the user equipment.

According to the fifth possible implementation manner of the first aspect, in a sixth possible implementation manner of the first aspect, a backup of the list of networks with which registration can be successful is stored on a cloud server; and the acquiring, by user equipment, a list of networks with which registration can be successful includes: detecting, by the user equipment, whether the list of networks with which registration can be successful is stored in the non-volatile memory of the user equipment; and if not, acquiring, by the user equipment, the list of networks with which registration can be successful stored on the cloud server; or if yes, synchronizing, by the user equipment with the cloud server, the list of networks with which registration can be successful.

According to the sixth possible implementation manner of the first aspect, in a seventh possible implementation manner of the first aspect, the method further includes: after the list of networks with which registration can be successful is updated, synchronizing, by the user equipment with the cloud server, the list of networks with which registration can be successful.

According to the first aspect and any one of the first to fourth possible implementation manners of the first aspect, in an eighth possible implementation manner of the first aspect, the list of networks with which registration can be successful is stored in a subscriber identity module.

According to a second aspect, an embodiment of the present invention provides a roaming network access apparatus, where the apparatus includes:

an acquiring module, configured to acquire a list of networks with which registration can be successful;

a searching module, configured to search for an available network in a roaming area; and a registration module, configured to: each time the searching module finds an available network, determine whether the found available network is recorded in the list of networks with which registration can be successful acquired by the acquiring module, and if yes, attempt to register with the found available network.

According to the second aspect, in a first possible implementation manner of the second aspect, the list of networks with which registration can be successful is a list used for recording historical roaming information, where the historical roaming information is information about a network with which the user has successfully registered during roaming.

According to the first possible implementation manner of the second aspect, in a second possible implementation manner of the second aspect, the registration module is further configured to: after attempting to register with the found available network, determine whether the registration is successful; and if yes, determine whether the found available network is recorded in the historical roaming information, and when it is determined that the found available network is not recorded in the historical roaming information, add a record of the found available network into the historical roaming information; or if not, determine whether the found available network is recorded in the historical roaming information, and when it is determined that the found available network is recorded in the historical roaming information, delete a record of the found available network from the historical roaming information.

According to the second aspect, in a third possible implementation manner of the second aspect, the list of networks with which registration can be successful is used for recording information about an operator-supported roaming network.

According to the second aspect and any one of the first to third possible implementation manners of the second aspect, in a fourth possible implementation manner of the second aspect, the acquiring module is further configured to: after acquiring the list of networks with which registration can be successful, acquire a mobile country code of a network covering the roaming area; and the registration module is further configured to: after determining that the found available network is recorded in the list of networks with which registration can be successful and before attempting to register with the found available network, determine whether the found available network is a network that is in the list of networks with which registration can be successful and that matches the mobile country code; and if yes, perform the step of attempting to register with the found available network.

According to the second aspect and any one of the first to fourth possible implementation manners of the second aspect, in a fifth possible implementation manner of the second aspect, the list of networks with which registration can be successful is stored in a non-volatile memory of the user equipment.

According to the fifth possible implementation manner of the second aspect, in a sixth possible implementation manner of the second aspect, a backup of the list of networks with which registration can be successful is stored on a cloud server; and the acquiring module is specifically configured to detect whether the list of networks with which registration can be successful is stored in the non-volatile memory of the user equipment; and if not, acquire the list of networks with which registration can be successful stored on the cloud server; or if yes, synchronize, with the cloud server, the list of networks with which registration can be successful.

According to the sixth possible implementation manner of the second aspect, in a seventh possible implementation manner of the second aspect, the acquiring module is further configured to: after the list of networks with which registration can be successful is updated, synchronize, with the cloud server, the list of networks with which registration can be successful.

According to the second aspect and any one of the first to fourth possible implementation manners of the second aspect, in an eighth possible implementation manner of the second aspect, the list of networks with which registration can be successful is stored in a subscriber identity module.

According to the roaming network access method and apparatus provided in the embodiments of the present invention, when user equipment of a user initially access a network in a roaming area, in a network searching process, each time the user equipment finds a cell, the user equipment determines whether a PLMN to which the cell belongs is recorded in a list of networks with which registration can be successful of the user; and if yes, the user equipment attempts to register with the network to which the cell belongs; or if not, the user equipment continues the foregoing searching process until the registration is successful. By means of the list of networks with which registration can be successful, duration of network searching performed by the user equipment is reduced, and the user equipment targetedly selects, based on the list of networks with which registration can be successful, a PLMN to register with, so that time spent by the user equipment on initial network access in the roaming area is shortened and user experience is improved.

DESCRIPTION OF EMBODIMENTS

Figure 1:
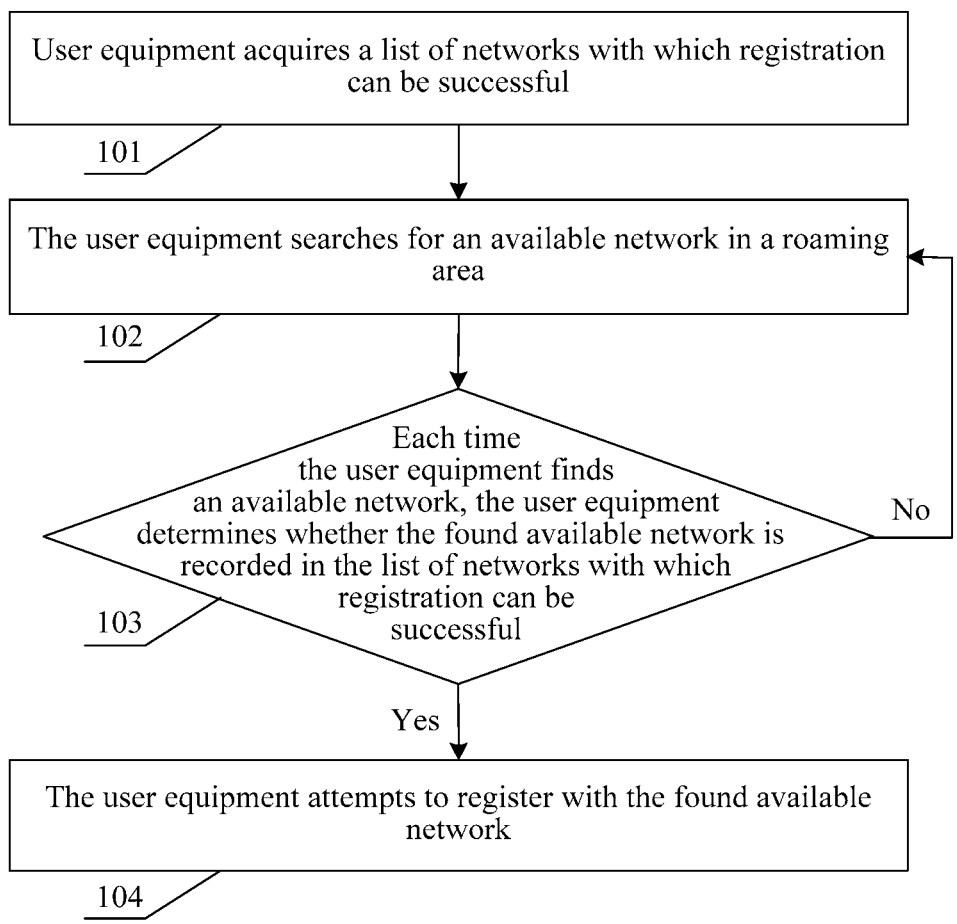
FIG. 1 is a flowchart of a roaming network access method according to an embodiment of the present invention.

FIG. 1 is a flowchart of a roaming network access method according to an embodiment of the present invention. As shown in FIG. 1, the method includes:

101: User equipment acquires a list of networks with which registration can be successful.

The user equipment may acquire the list from a local storage unit or may acquire the list from another device or network.

102: The user equipment searches for an available network in a roaming area.

There is no strict time sequence between steps 101 and 102, that is, step 101 may be performed before step 102, or step 101 may be performed after step 102, or steps 101 and 102 may be performed simultaneously.

103: Each time the user equipment finds an available network, the user equipment determines whether the found available network is recorded in the list of networks with which registration can be successful. If yes, proceed to step 104; or if not, go back to step 102 to continue to search for an available network.

104: The user equipment attempts to register with the found available network.

Specifically, the roaming network access method provided in this embodiment of the present invention may be applied to a scenario in which user equipment of a user initially accesses a network in a roaming area. The user equipment may be a wireless communications device such as a cellular phone or a tablet. Each member in the list of networks with which registration can be successful may include: a PLMN and/or a RAT of a network with which registration can be successful.

When the user equipment initially accesses a network in a roaming area, the user equipment searches, based on a frequency band and/or a RAT supported by the user equipment, for an available network; if it is determined that the user equipment is in a roaming state, each time the user equipment finds a cell, the user equipment matches a PLMN to which the cell belongs with PLMNs in the list of networks with which registration can be successful, to determine whether the PLMN to which the cell belongs is recorded in the list of networks with which registration can be successful; and if yes, the user equipment attempts to register with the network to which the cell belongs; or if not, the user equipment continues to perform the network searching process.

Optionally, while the user equipment attempts to register with the found available network, the user equipment still continues to search for an available network.

Optionally, after determining that the found available network is recorded in the list of networks with which registration can be successful, the user equipment stops the PLMN searching process, and attempts to register with the found available network.

In the prior art, when the user equipment initially accesses a network in a roaming area, the user equipment first performs full-band network searching by traversing all frequency bands and/or RATs that are supported by the user equipment, and after the whole network searching process is completed, the user equipment sequentially selects PLMNs among all found networks in the following sequence: HPLMN→UPLMN→OPLMN→OTHER Available PLMN and attempts to register, until the registration is successful. It needs to take a relatively long time for the user equipment to successfully register with a network in the roaming area, which affects user experience due to an excessively long waiting time.

Compared with the prior art, according to the roaming network access method provided in this embodiment of the present invention, when user equipment of a user initially access a network in a roaming area, if it is determined that the user equipment is in a roaming state, each time the user equipment finds a cell, the user equipment determines whether a PLMN to which the cell belongs is recorded in a list of networks with which registration can be successful of the user; and if yes, the user equipment attempts to register with the network to which the cell belongs; or if not, the user equipment continues the foregoing searching process until the registration is successful. In the roaming network access method provided in this embodiment of the present invention, by means of the list of networks with which registration can be successful, duration of network searching performed by the user equipment is reduced, and the user equipment targetedly selects, based on the list of networks with which registration can be successful, a PLMN to register with, so that time spent by the user equipment on initial network access in the roaming area is shortened and user experience is improved.

Optionally, based on the foregoing embodiment, the list of networks with which registration can be successful is a list used for recording historical roaming information, where the historical roaming information is information about a network with which the user has successfully registered during roaming.

Specifically, when the user equipment of the user initially accesses a network in a roaming area, based on the information about the network with which the user has successfully registered during roaming, when finding a network that matches the network with which the user has successfully registered during historical roaming, the user equipment stops the searching process and directly attempts to register with the network, thereby avoiding that the user equipment performs a large quantity of unnecessary PLMN searches after startup; and the user equipment targetedly selects a PLMN to register with, so that time spent by the user equipment on initial network access in the roaming area is shortened and user experience is improved.

Further, the user equipment may update the historical roaming information in real time according to a result of each registration attempt.

Figure 2:
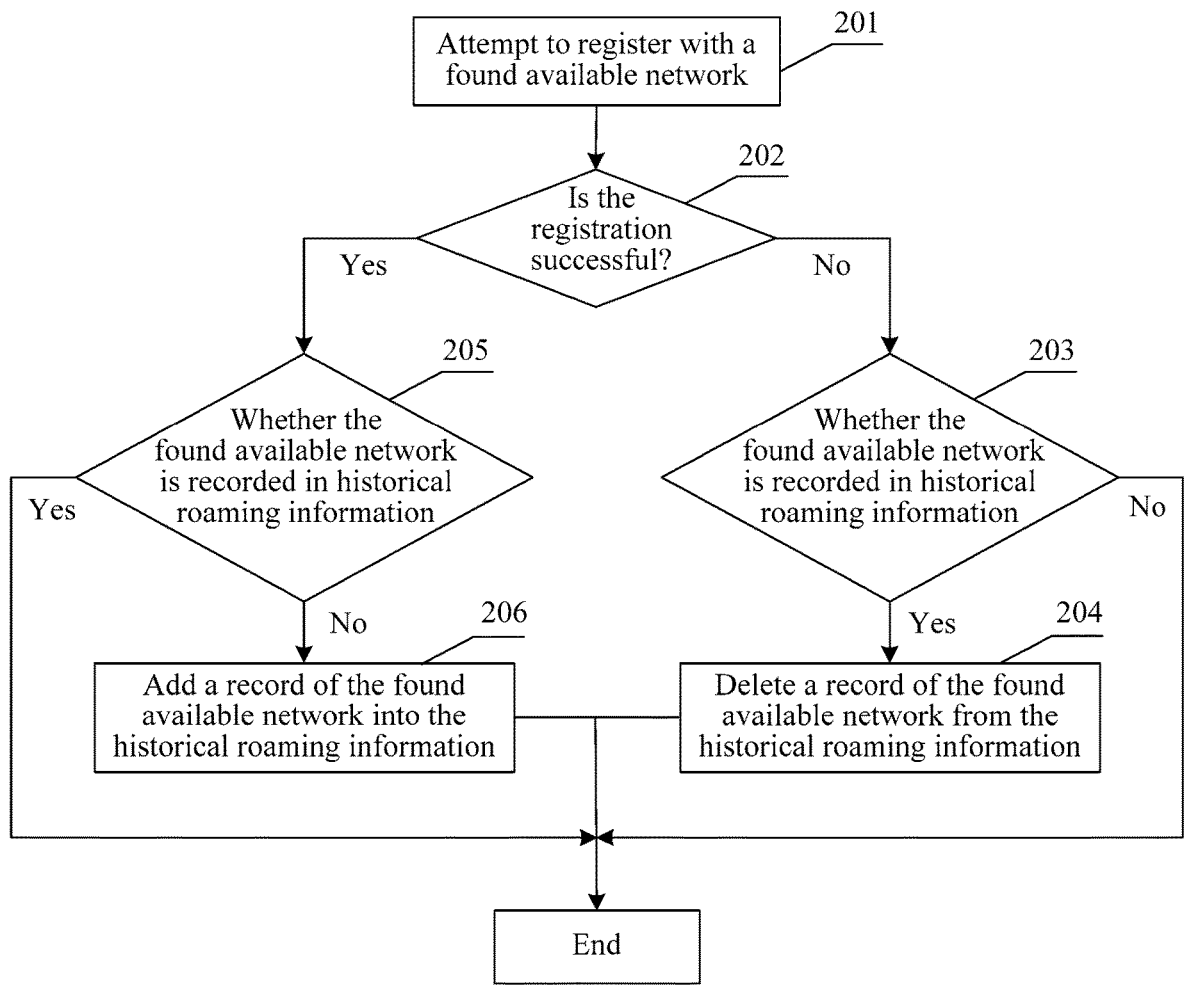
FIG. 2 is a flowchart of updating historical roaming information according to an embodiment of the present invention.

FIG. 2 is a flowchart of updating historical roaming information according to an embodiment of the present invention. This embodiment of the present invention is implemented based on the method embodiment shown in FIG. 1. Further, in a method in this embodiment of the present invention, how to update historical roaming information of a user is further described. As shown in FIG. 2, the method includes:

201: When user equipment initially accesses a network during roaming in a roaming area, the user equipment attempts to register with a found available network.

202: The user equipment determines whether the registration is successful. If not, proceed to step 203; or if yes, proceed to step 205.

203: The user equipment determines whether the found available network is recorded in the historical roaming information. If yes, proceed to step 204; or if not, the update process ends.

204: Delete a record of the found available network from the historical roaming information, and the update process ends.

205: The user equipment determines whether the found available network is recorded in the historical roaming information. If not, proceed to step 206; or if yes, the update process ends.

206: Add a record of the found available network into the historical roaming information, and the update process ends.

Optionally, based on the foregoing embodiment, the list of networks with which registration can be successful is used for recording information about an operator-supported roaming network (OPLMN).

Specifically, when the user equipment of the user initially accesses a network in a roaming area, based on the information about the operator-supported roaming network, when finding a network that matches the operator-supported roaming network, the user equipment stops the searching process and directly attempts to register with the network, thereby avoiding that the user equipment performs a large quantity of unnecessary PLMN searches after startup; and the user equipment targetedly selects a PLMN to register with, so that time spent by the user equipment on initial network access in the roaming area is shortened and user experience is improved.

Based on the foregoing embodiment, the list of networks with which registration can be successful may record both the historical roaming information and the OPLMN, so as to further reduce duration of network searching performed by the user equipment; and the user equipment targetedly selects, based on the list of networks with which registration can be successful, a PLMN to register with, so that time spent by the user equipment on initial network access in the roaming area is shortened and user experience is improved.

Optionally, the user equipment may screen, according to a mobile country code of a network covering the roaming area, the acquired list of networks with which registration can be successful, that is, obtain, by means of screening in the list of networks with which registration can be successful, a network that matches the mobile country code. It may be understood that the network covering the roaming area may be one or more networks of operators of one country, or may be multiple networks of two or more countries. For example, in a border region between countries, networks of operators of neighboring countries call both cover the border region. In this case, the network covering the roaming area includes the networks, covering the border region, of the operators of the neighboring countries; therefore, the mobile country code of the network covering the roaming area is not limited to one mobile country code but includes mobile country codes of the networks, covering the border region, of the operators of the neighboring countries, that is, in the border region, the network covering the roaming area is not limited to having one mobile country code.

Based on this, during the network searching process, each time the user equipment finds an available network, the user equipment determines whether the found available network is recorded in the network that matches the mobile country code and is obtained by means of screening; and if yes, the user equipment attempts to register with the found available network. In the roaming network access method provided in this embodiment of the present invention, the networks in the list of networks with which registration can be successful are screened by using the mobile country code of the roaming area, which further narrows a network range from which the user equipment selects a PLMN, so that the user equipment can targetedly select a PLMN to register with, thereby shortening time spent by the user equipment on initial network access in the roaming area and improving user experience.

Alternatively, the user equipment may not screen records in the list of networks with which registration can be successful; instead, after determining that the found available network is recorded in the list of networks with which registration can be successful, the user equipment further determines whether the found available network is a network that is in the list of networks with which registration can be successful and that matches the mobile country code; and if yes, the user equipment attempts to register with the found available network.

Optionally, based on the foregoing embodiment, the list of networks with which registration can be successful is stored in a non-volatile memory of the user equipment.

Further, a backup of the list of networks with which registration can be successful is stored on a cloud server. The cloud server is used to store a list of networks with which registration can be successful of at least one user, and a list of networks with which registration can be successful of each user is separately stored according to an identifier of each user, where the identifier may be information characterizing a user identity, for example, a cloud account or a phone number of a user, or an International Mobile Equipment Identity (IMEI) sequence number of user equipment. After a user loses or replaces the user equipment, user equipment after the replacement may acquire a list of networks with which registration can be successful of the user from the cloud server, and during initial network access in a roaming area, use the list of networks with which registration can be successful, to narrow a network range from which the user equipment selects a PLMN, so that the user equipment can targetedly select a PLMN to register with, thereby shortening time spent by the user equipment on initial network access in the roaming area and improving user experience.

A feasible implementation manner of acquiring, by the user equipment, the list of networks with which registration can be successful is: detecting, by the user equipment, whether the list of networks with which registration can be successful is stored in the non-volatile memory of the user equipment; and if not, acquiring, by the user equipment from the cloud server, the list of networks with which registration can be successful stored on the cloud server; or if yes, acquiring, by the user equipment, the list of networks with which registration can be successful from the non-volatile memory, and synchronizing, with the cloud server, the list of networks with which registration can be successful, so that version information (for example, a synchronization identifier and a timestamp) of the list of networks with which registration can be successful stored in the non-volatile memory of the user equipment is consistent with that of the list of networks with which registration can be successful stored on the cloud server.

Further, after the list of networks with which registration can be successful is updated, the user equipment synchronizes, with the cloud server, the list of networks with which registration can be successful, and the user equipment synchronously uploads, to the cloud server, a change in information stored in the list of networks with which registration can be successful, to update the list of networks with which registration can be successful and version information that are stored on the cloud server.

Optionally, based on the foregoing embodiment, the list of networks with which registration can be successful is stored in a subscriber identity module (SIM). A feasible implementation manner of storing the list of networks with which registration can be successful in the subscriber identity module is: adding, into the SIM, a new elementary file (EF): EF-Roam, where the EF-Roam is used to store the list of networks with which registration can be successful of the user.

That the list of networks with which registration can be successful records the historical roaming information is used as an example: when the user equipment initially accesses a network in a roaming area:

after a registration success message or a location update success message is received, information about a current available network with which registration is successful is stored in the EF-Roam; or when a registration request of the user equipment is rejected, where for example, a rejection reason is PLMN not allowed, the user equipment determines whether a current available network with which registration fails is recorded in the EF-Roam; and if yes, the user equipment deletes it from the EF-Roam.

Optionally, a valid time field is set in the EF-Roam. While information about an available network is newly added into the EF-Roam, a valid time is started, and when the valid time expires, the information about the available network is automatically deleted from the EF-Roam.

Optionally, based on the foregoing embodiment, a feasible implementation manner of acquiring, by the user equipment, the information about the operator-supported roaming network is: combining, by the user equipment, OPLMN lists that are separately acquired from the subscriber identity module, and/or the cloud server, and/or the non-volatile memory of the user equipment to form a combined OPLMN list.

Figure 3:
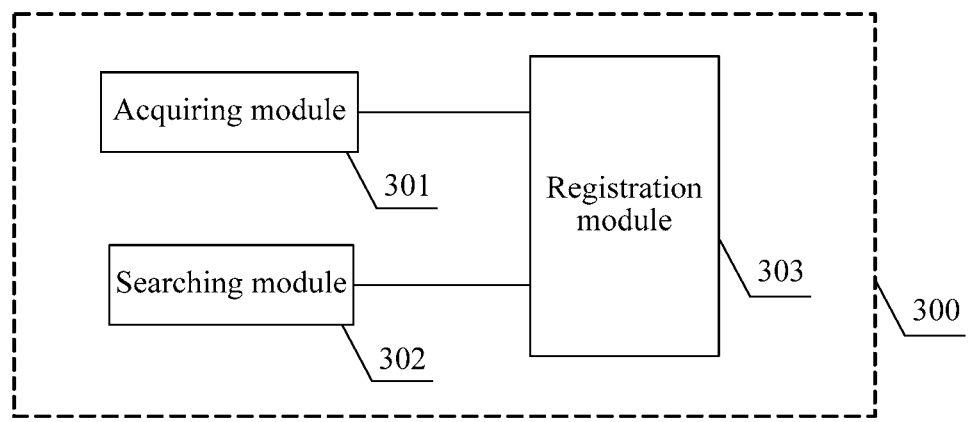
FIG. 3 is a schematic structural diagram of a roaming network access apparatus according to an embodiment of the present invention.

FIG. 3 is a schematic structural diagram of a roaming network access apparatus according to an embodiment of the present invention. As shown in FIG. 3, the roaming network access apparatus 300 provided in this embodiment of the present invention includes:

an acquiring module 301, configured to acquire a list of networks with which registration can be successful;

a searching module 302, configured to search for an available network in a roaming area; and a registration module 303, configured to: each time the searching module 302 finds an available network, determine whether the found available network is recorded in the list of networks with which registration can be successful acquired by the acquiring module 301, and if yes, attempt to register with the found available network.

The roaming network access apparatus 300 provided in this embodiment of the present invention may be disposed on user equipment. The roaming network access apparatus 300 may be configured to perform the technical solution in the method embodiment shown in FIG. 1. Implementation principles and technical effects thereof are similar, and details are not described herein again.

Optionally, the list of networks with which registration can be successful is a list used for recording historical roaming information, where the historical roaming information is information about a network with which the user has successfully registered during roaming.

Further, the registration module 303 is further configured to: after attempting to register with the found available network, determine whether the registration is successful; and if yes, determine whether the found available network is recorded in the historical roaming information, and when it is determined that the found available network is not recorded in the historical roaming information, add a record of the found available network into the historical roaming information; or if not, determine whether the found available network is recorded in the historical roaming information, and when it is determined that the found available network is recorded in the historical roaming information, delete a record of the found available network from the historical roaming information.

Optionally, the list of networks with which registration can be successful is used for recording information about an operator-supported roaming network.

Based on the foregoing embodiment, the acquiring module 301 is further configured to: after acquiring the list of networks with which registration can be successful, acquire a mobile country code of a network covering the roaming area; and the registration module 303 is further configured to: after determining that the found available network is recorded in the list of networks with which registration can be successful and before attempting to register with the found available network, determine whether the found available network is a network that is in the list of networks with which registration can be successful and that matches the mobile country code; and if yes, perform the step of attempting to register with the found available network.

Based on the foregoing embodiment, the list of networks with which registration can be successful is stored in a non-volatile memory of the user equipment.

Further, a backup of the list of networks with which registration can be successful is stored on a cloud server; and the acquiring module 301 is specifically configured to detect whether the list of networks with which registration can be successful is stored in the non-volatile memory of the user equipment; and if not, acquire the list of networks with which registration can be successful stored on the cloud server; or if yes, synchronize, with the cloud server, the list of networks with which registration can be successful.

Further, the acquiring module 301 is further configured to: after the list of networks with which registration can be successful is updated, synchronize, with the cloud server, the list of networks with which registration can be successful.

Alternatively, based on the foregoing embodiment, the list of networks with which registration can be successful is stored in a subscriber identity module.

Figure 4:
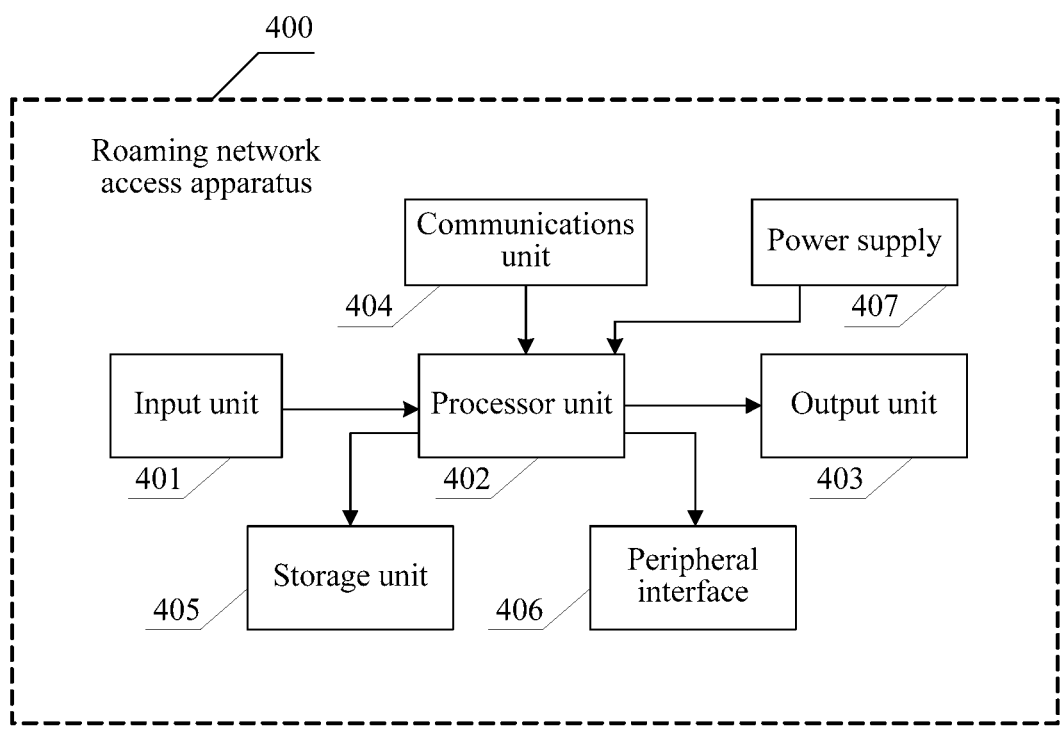
FIG. 4 is another schematic structural diagram of a roaming network access apparatus according to an embodiment of the present invention.

FIG. 4 is another schematic structural diagram of a roaming network access apparatus according to an embodiment of the present invention. As shown in FIG. 4, the roaming network access apparatus 400 provided in this embodiment of the present invention includes components such as an input unit 401, a processor unit 402, an output unit 403, a communications unit 404, a storage unit 405, a peripheral interface 406, and a power supply 407. These components communicate with each other by using one or more buses. Persons skilled in the art may understand that a structure of the roaming network access apparatus 400 shown in FIG. 4 does not constitute a limitation to the present invention, and the structure may be a bus structure or a star structure, and may include more or fewer components than those shown in FIG. 4, or some components may be combined, or components are arranged differently. In this implementation manner of the present invention, the roaming network access apparatus 400 may be any mobile or portable communications device, including, but not limited to: a mobile phone, a mobile computer, a tablet, a personal digital assistant (PDA), a media player, a smart television, a combination of two or more of the foregoing items, and the like.

The input unit 401 is configured to implement interaction between a user and the roaming network access apparatus 400 and/or to enter information into the roaming network access apparatus 400. For example, the input unit 401 may receive digital or character information entered by a user, so as to generate a signal input related to user settings or function control. In a specific implementation manner of the present invention, the input unit 401 may be a touch panel, or may be another human-computer interaction interface such as a physical input key or a microphone, or may be another external information capturing apparatus such as a camera. The touch panel, also referred to as a touchscreen or a touchscreen, and may collect a touch operation motion performed by a user on the touch panel or an operation motion near the touch panel performed by a user, for example, an operation motion performed by the user on or near the touch panel by using any suitable object or accessory such as a finger or a stylus, and a corresponding connection apparatus is driven according to a preset program. Optionally, the touch panel may include two parts: a touch detection apparatus and a touch controller. The touch detection apparatus detects a touch operation of a user, converts the detected touch operation into an electrical signal, and sends the electrical signal to the touch controller; and the touch controller receives the electrical signal from the touch detection apparatus, converts the electrical signal into touch point coordinates, and then sends the touch point coordinates to the processor unit 402. The touch controller may also receive and execute a command sent by the processor unit 402. In addition, the touch panel may be implemented by using multiple types of touch panels, such as a resistive touch panel, a capacitive touch panel, an infrared touch panel, or a surface acoustic wave touch panel. In other implementation manners of the present invention, the physical input key used by the input unit 401 may include, but is not limited to one or more of the following: a physical keyboard, a function key (such as a volume control key or a switch key), a trackball, a mouse, a joystick, and the like. A microphone-form input unit may collect a voice entered by a user or an environment and convert the voice into a command that is in a form of an electrical signal and that can be executed by the processor unit 402.

In some other implementation manners of the present invention, the input unit 401 may be various types of sensors, for example, a Hall element, configured to detect physical quantities of the roaming network access apparatus 400, such as force, a force moment, pressure, stress, a location, a shift, a speed, an acceleration, an angle, an angular velocity, revolutions, a rotational speed, and a time at which a working state changes, and convert the physical quantities into electric quantities for detection and control. Other sensors may include a gravity sensor, a tri-axis accelerometer, a gyroscope, and the like.

The processor unit 402 is a control center of the roaming network access apparatus 400, and is connected to all parts of the whole roaming network access apparatus 400 by using various interfaces and buses. By running or executing a software program and/or module stored in the storage unit 405, and invoking data stored in the storage unit 405, the processor unit 402 performs various functions and/or data processing of the roaming network access apparatus 400. The processor unit 402 may be consist of an integrated circuit (Integrated Circuit, IC for short), for example, the processor unit 402 may include a single packaged IC or may include multiple packaged ICs for connecting a same function or different functions having a same function or different functions. For example, the processor unit 402 may include only a central processing unit (Central Processing Unit, CPU for short), or may be a combination of a GPU, a digital signal processor (Digital Signal Processor, DSP for short), and a control chip (such as a baseband chip) in the communications unit 404. In this implementation manner of the present invention, the CPU may be a single computing core, or may include multiple computing cores.

The communications unit 404 is configured to implement communication between the roaming network access apparatus 400 and another device; and a data packet may be sent or received by using the communications unit 404. The communications unit 404 may include communications modules such as a wireless local area network (WLAN) module, a Bluetooth module, and a baseband module; and a radio frequency (RF) circuit corresponding to the communications modules, configured to perform wireless local area network communication, Bluetooth communication, infrared communication, and/or cellular communications system communication, for example, Wideband Code Division Multiple Access (W-CDMA) and/or High Speed Downlink Packet Access (HSDPA). The communications module is configured to control communication between components in the roaming network access apparatus 400, and can support direct memory.

In different implementation manners of the present invention, the communications modules in the communications unit 404 are generally presented in a form of integrated circuit chips, and may be combined selectively, and the communications unit 404 does not need to include all the communications modules and corresponding antenna groups. For example, the communications unit 404 may include only a baseband chip, a radio frequency chip, and a corresponding antenna, so as to provide a communication function in a cellular communications system. By means of a radio communications connection, such as wireless LAN access or WCDMA access, established by the communications unit 404, the roaming network access apparatus 400 may be connected to a cellular network or the Internet. In some optional implementation manners of the present invention, the communications module in the communications unit 404, such as the baseband module, may be integrated into the processor unit 402; and an APQ+MDM series platform provided by Qualcomm is a typical example.

Specifically, in this embodiment of the present invention, the communications unit 404 searches for an available network in a roaming area. Optionally, the communications unit 404 is further configured to acquire a list of networks with which registration can be successful from a network server.

The output unit 403 includes, but is not limited to: a video output unit and an audio output unit. The video output unit is configured to output texts, images, and/or videos. The video output unit may include a display panel, for example, a display panel configured in a form such as an LCD (liquid crystal display), an OLED (organic light-emitting diode), or a field emission display (FED). Alternatively, the video output unit may include a reflective display such as an electrophoretic display, or a display using a technology of interferometric modulation of light. The video output unit may include a single display or multiple displays of different sizes. In a specific implementation manner of the present invention, the touch panel used by the foregoing input unit 401 may also serve as a display panel of the output unit 403. For example, after detecting a touch gesture operation on the touch panel or a gesture operation near the touch panel, the touch panel transmits the touch gesture operation or the gesture operation to the processor unit 402 to determine a type of a touch event, and then the processor unit 402 provides a corresponding visual output on the display panel according to the type of the touch event. Although in FIG. 4, the input unit 401 and the output unit 403 are used as two separate components to implement input and output functions of the roaming network access apparatus 400, in some embodiments, the touch panel and the display panel may be integrated to implement the input and output functions of the roaming network apparatus 400. For example, the video output unit may display various graphical user interfaces (GUI) to serve as virtual control components, which include, but are not limited to: a window, a scroll bar, an icon, and a clipbook, to help a user perform an operation in a touch manner.

In a specific implementation manner of the present invention, the video output unit includes a filter and an amplifier, configured to filter and amplify a video output by the processor unit 402. The audio output unit includes a digital-to-analog converter, configured to convert an audio signal output by the processor unit 402 from a digital format into an analog format.

The storage unit 405 may be configured to store a software program and module. By running the software program and module stored in the storage unit 405, the processor unit 402 performs various functional applications of the roaming network access apparatus 400 and implements data processing. The storage unit 405 mainly includes a program storage area and a data storage area. The program storage area may store an operating system, and an application program required by at least one function, such as a sound playback function and an image display function. The data storage area may store data (such as audio data and an address book) created according to use of the roaming network access apparatus 400, and the like. In a specific implementation manner of the present invention, the storage unit 405 may include a volatile memory, such as a non-volatile random access memory (NVRAM), a phase change random access memory (PRAM), and a magnetoresistive random access memory (MRAM), and may further include a non-volatile memory, such as at least one magnetic disk storage device, an electrically erasable programmable read-only memory (EEPROM), and a flash memory device such as a NOR flash memory or a NAND flash memory. The non-volatile memory stores an operating system and an application program that are executed by the processor unit 402. The processor unit 402 loads a to-be-run program and data from the non-volatile memory to memory and stores digital content in a mass storage apparatus. The operating system includes various components and/or drivers configured to control and manage routine system tasks such as memory management, storage device control, and power management, and facilitate communication between various software and hardware. In this implementation manner of the present invention, the operating system may be the Android system of Google, the iOS system developed by Apple or the Windows operating system developed by Microsoft, or may be an embedded operating system such as Vxworks.

The application program includes any application installed on the roaming network access apparatus 400, including but not limited to: a browser, an email, an instant messaging service, word processing, keyboard virtualization, a window widget, encryption, digital copyright management, speech recognition, speech copy, positioning (such as a function provided by a Global Positioning System), music playback, and the like.

Specifically, in this embodiment of the present invention, optionally, the storage unit 405 may store the list of networks with which registration can be successful. The storage unit 405 stores program data. The processor unit 402 executes the program data, so that each time the communications unit 404 finds an available network, the communications unit 404 determines whether the found available network is recorded in the list of networks with which registration can be successful; and if yes, the communications unit 404 attempts to register with the found available network.

Further, historical roaming information stored in the storage unit 405 includes a first roaming network list, or historical roaming information acquired by the communications unit 404 includes a first roaming network list, where the first roaming network list is used to record information of a network with which the user has successfully registered during roaming; and the processor unit 402 executes the program data stored in the storage unit 405 to determine whether the available network found by the communications unit 404 is recorded in the first roaming network list; and if yes, the processor unit 402 maintains a priority of the found available network or sets a priority of the found available network to be higher than that of a network not recorded in the first roaming network list.

The power supply 407 is configured to supply power to different components of the roaming network access apparatus 400 to maintain operation of the components. It is generally understood that, the power supply may be a built-in battery such as a common lithium-ion battery or a nickel-metal hydride battery (NiMH) battery, and may also include an external power supply that directly supplies power to the roaming network access apparatus 400, such as an alternating current (AC) adapter. In some implementation manners of the present invention, the power supply 407 may have a boarder definition, for example, the power supply 407 may further include a power management system, a charging system, a power fault detection circuit, a power converter or inverter, a power status indicator (such as a light emitting diode), and any other component associated with electrical energy generation, management, and distribution of the roaming network access apparatus 400.

It should be noted that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. In the foregoing embodiments, the description of each embodiment has a focus. For a part that is not described in detail in an embodiment, reference may be made to related descriptions in other embodiments. In addition, the relational terms herein such as first and second are used only to differentiate an entity from another entity, but do not require or imply any actual relationship or sequence between these entities.

Persons of ordinary skill in the art may understand that all or some of the steps of the foregoing method embodiments may be implemented by a program instructing related hardware. The foregoing program may be stored in a computer-readable storage medium. When the program runs, the steps of the foregoing method embodiments are performed. The foregoing storage medium may include: any medium that can store program code, such as a read-only memory (ROM), a random access memory (RAM), a magnetic disk, or an optical disc.

Finally, it should be noted that the foregoing embodiments are merely intended for describing the technical solutions of the present invention, and reference or a combination may be made between the technical solutions provided in each embodiment. Although the present invention is described in detail with reference to the foregoing embodiments, persons of ordinary skill in the art should understand that they may still make modifications to the technical solutions described in the foregoing embodiments or make equivalent replacements to some or all technical features thereof; however, these modifications or replacements do not make the essence of corresponding technical solutions depart from the scope of the technical solutions in the embodiments of the present invention.

What is claimed is:

1. A roaming network access method, comprising:
    acquiring, by a user equipment, a list of networks with which registration can be successful; searching, by the user equipment, for an available network in a roaming area; each time the user equipment finds an available network, determining, by the user equipment, whether the found available network is recorded in the list of networks with which registration can be successful;
    when it is determined that the found available network is recorded in the list of networks with which registration can be successful, stopping the searching for an available network and directly attempting, by the user equipment, to register with the found available network; and
    when it is determined that the found available network is absent in the list of networks, continuing to search, by the user equipment, an available network in the roaming area;
    wherein the list of networks with which registration can be successful is a list used for recording (a) historical roaming information associated with only the user equipment itself and (b) operator controlled public land mobile network (OPLMN) associated with the networks with which the user equipment's registration can be successful, and
    the list of the networks is stored in a non-volatile memory of the user equipment, and a backup of the list of the networks is separately stored from other list of networks of other users with which registration can be successful on a cloud server according to an identifier of a user of the user equipment including a cloud account or a phone number of the user, or an International Mobile Equipment Identity (MEI) sequence number of the user equipment, wherein the historical roaming information is information about the at least one network with which the user equipment has successfully registered during roaming.

2. The method according to claim 1, wherein after the attempting, by the user equipment, to register with the found available network, the method further comprises:
    determining, by the user equipment, whether the registration is successful; and
    when it is determined the registration is successful, determining, by the user equipment, whether the found available network is recorded in the historical roaming information, and when it is determined that the found available network is not recorded in the historical roaming information, adding a record of the found available network into the historical roaming information; and
    when it is determined that the registration fails, determining, by the user equipment, whether the found available network is recorded in the historical roaming information, and when it is determined that the found available network is recorded in the historical roaming information, deleting a record of the found available network from the historical roaming information.

3. The method according to claim 1, wherein the list of networks with which registration can be successful is used for recording information about an operator-supported roaming network.

4. The method according to claim 1, wherein after the acquiring, by a user equipment, a list of networks with which registration can be successful, the method further comprises:
    acquiring, by the user equipment, a mobile country code of a network covering the roaming area; and
    after the determining, by the user equipment, that the found available network is recorded in the list of networks with which registration can be successful and before the attempting, by the user equipment, to register with the found available network, the method further comprises:
    determining, by the user equipment, whether the found available network is a network that is in the list of networks with which registration can be successful and that matches the mobile country code; and
    when it is determined that the found available network is recorded in the list of networks with which registration can be successful, attempting, by the user equipment, to register with the found available network.

5. The method according to claim 1, wherein a backup of the list of networks with which registration can be successful is stored on a cloud server; and
    the acquiring, by user equipment, a list of networks with which registration can be successful comprises:
    detecting, by the user equipment, whether the list of networks with which registration can be successful is stored in the non-volatile memory of the user equipment; and
    when it is determined that the registration fails, acquiring, by the user equipment, the list of networks with which registration can be successful stored on the cloud server; and
    when it is determined that the found available network is recorded in the list of networks with which registration can be successful, synchronizing, by the user equipment with the cloud server, the list of networks with which registration can be successful.

6. The method according to claim 5, wherein the method further comprises:

after the list of networks with which registration can be successful is updated, synchronizing, by the user equipment with the cloud server, the updated list of networks with which registration can be successful.

7. A roaming network access user equipment, comprising a processor, and a non-transitory computer-readable storage medium including computer executable instructions executed by the processor to perform, on the user equipment, operations comprising:
  acquiring a list of networks with which registration can be successful;
  searching for an available network in a roaming area; and
  each time the searching module finds an available network, determining whether the found available network is recorded in the list of networks with which registration can be successful;
  when it is determined that the found available network is recorded in the list of networks with which registration can be successful, stopping the searching for an available network and directly attempting to register with the found available network; and
  when it is determined that the found available network is absent in the list, continuing to search an available network in the roaming area;
  wherein the list of networks with which registration can be successful is a list used for recording (a) historical roaming information associated with only the user equipment itself and (b) operator controlled public land mobile network (OPLMN) associated with the networks with which the user equipment's registration can be successful, and
  the list of the networks is stored in a non-volatile memory of the user equipment, and a backup of the list of the networks is separately stored from other list of networks of other users with which registration can be successful on a cloud server according to an identifier of a user of the user equipment including a cloud account or a phone number of the user, or an International Mobile Equipment Identity (IMEI) sequence number of the user equipment,
  wherein the historical roaming information is information about the at least one network with which the user equipment has successfully registered during roaming.

8. The apparatus according to claim 7, wherein the operations further comprise:
  after attempting to register with the found available network, determining whether the registration is successful; and
  when it is determined that the registration is successful, determining whether the found available network is recorded in the historical roaming information, and
  when it is determined that the found available network is not recorded in the historical roaming information, adding a record of the found available network into the historical roaming information; and
  when it is determined that the registration fails, determining whether the found available network is recorded in the historical roaming information, and when it is determined that the found available network is recorded in the historical roaming information, deleting a record of the found available network from the historical roaming information.

9. The apparatus according to claim 7, wherein the list of networks with which registration can be successful is used for recording information about an operator-supported roaming network.

10. The apparatus according to claim 7, wherein the operations further comprise:
  after acquiring the list of networks with which registration can be successful, acquiring a mobile country code of a network covering the roaming area; and
  after determining that the found available network is recorded in the list of networks with which registration can be successful and before attempting to register with the found available network, determining whether the found available network is a network that is in the list of networks with which registration can be successful and that matches the mobile country code; and
  when it is determined that the found available network is recorded in the list of networks with which registration can be successful and that matches the mobile country code, attempting to register with the found available network.

11. The apparatus according to claim 7, wherein a backup of the list of networks with which registration can be successful is stored on a cloud server; and
  the operations further comprise:
  detecting whether the list of networks with which registration can be successful is stored in the non-volatile memory of the user equipment; and
  when it is determined that the registration fails, acquiring the list of networks with which registration can be successful stored on the cloud server; and
  when it is determined that the found available network is recorded in the list of networks with which registration can be successful, synchronizing, with the cloud server, the list of networks with which registration can be successful.

12. The apparatus according to claim 11, wherein the operations further comprise: after the list of networks with which registration can be successful is updated on the apparatus, synchronizing, with the cloud server, the list of networks with which registration can be successful.

* * * * *